C. H. TRASK,

Assignor to J. W. ABBOTT, Trustee of THE LYNN LASTING-MACHINE ASSOCIATION.

Machine for Lasting Boots and Shoes.

No. 8,954. Reissued Nov. 4, 1879.

Witnesses

Jos. P. Livermore.

L. D. Connor.

Inventor.

Charles H. Trask, by Crosby & Gregory, Attys.

3 Sheets—Sheet 2.

C. H. TRASK,

Assignor to J. W. ABBOTT, Trustee of THE LYNN LASTING-MACHINE ASSOCIATION.

Machine for Lasting Boots and Shoes.

No. 8,954. Reissued Nov. 4, 1879.

Witnesses.
Jos. P. Livermore
L. F. Connor

Inventor,
Charles H. Trask.
by Crosby & Gregory
Attys

3 Sheets—Sheet 3.

C. H. TRASK,

Assignor to J. W. ABBOTT, Trustee of THE LYNN LASTING-MACHINE ASSOCIATION.

Machine for Lasting Boots and Shoes.

No. 5,954. Reissued Nov. 4, 1879.

Witnesses.

Jos. P. Livermore

L. A. Connor

Inventor.

Charles H. Trask.

by Crosby & Gregory, Attys

UNITED STATES PATENT OFFICE.

CHARLES H. TRASK, OF LYNN, MASSACHUSETTS, ASSIGNOR TO JOSEPH W. ABBOTT, TRUSTEE OF THE LYNN LASTING MACHINE ASSOCIATION.

IMPROVEMENT IN MACHINES FOR LASTING BOOTS AND SHOES.

Specification forming part of Letters Patent No. 107,981, dated October 4, 1870; Reissue No. 8,954, dated November 4. 1879; application filed September 23, 1879.

*To all whom it may concern:*

Be it known that I, CHARLES H. TRASK, of Lynn, in the county of Essex and State of Massachusetts, have invented a new and useful Machine for Lasting Shoes; and I do hereby declare the same to be fully described in the following specification and represented in the accompanying drawings, of which—

Figure 1:
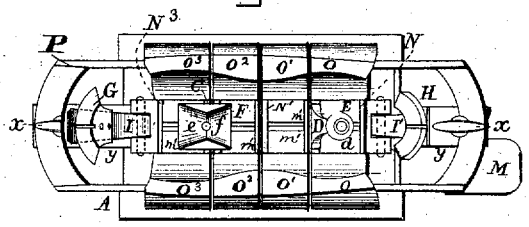
Figure 2:
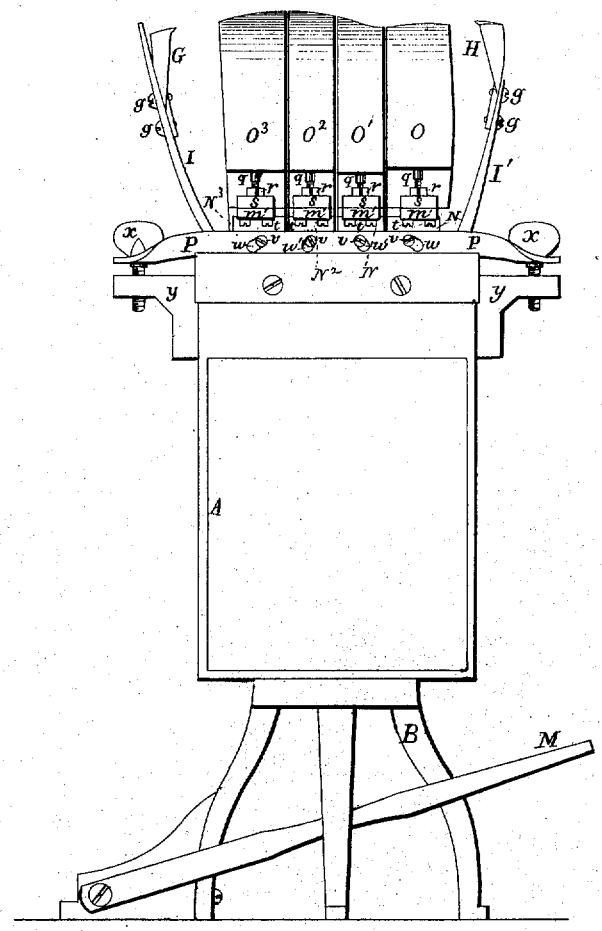
Figure 3:
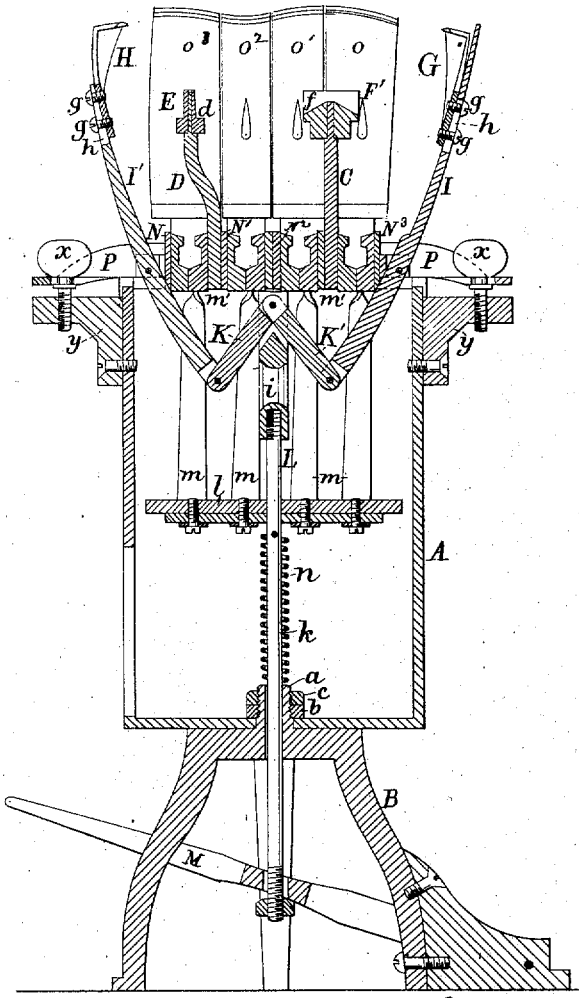
Figure 4:
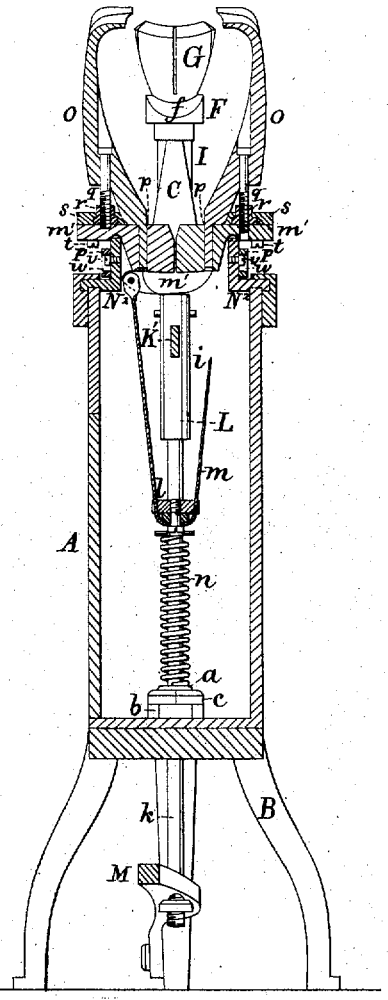
Figure 13:
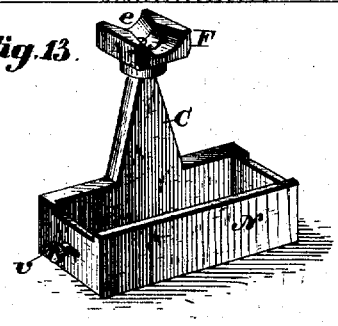
Figure 5:
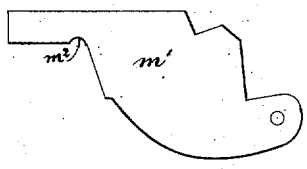
Figure 6:
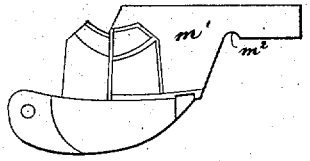
Figure 7:
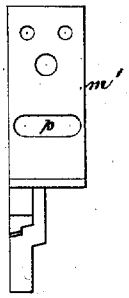
Figure 9:
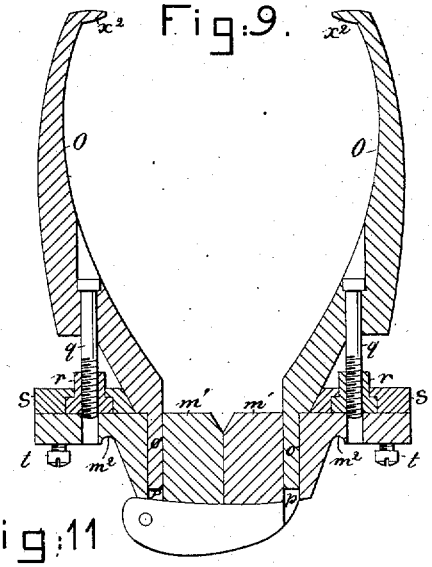
Figure 8:
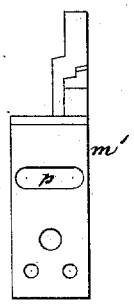
Figure 11:
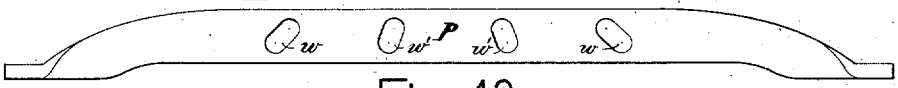
Figure 12:
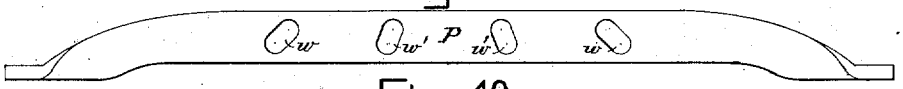
Figure 10:
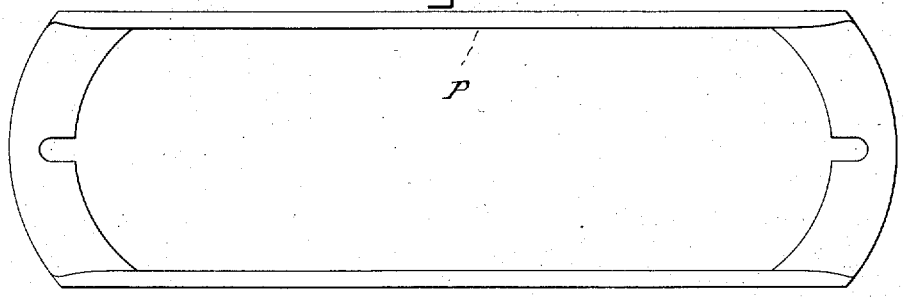

Figure 1 is a top view; Fig. 2, a front elevation. Fig. 3 is a vertical and longitudinal section. Fig. 4 is a vertical and transverse section of it. Figs. 5 and 6 are side views of the levers which carry the side and shank lasting jaws; Figs. 7 and 8, top views thereof. Fig. 9 is a transverse section taken through one pair of side-lasting jaws and their holding-levers; Figs. 10, 11, and 12, top and side views of the jaw-adjusting mechanism, whereby the carriages are moved longitudinally along the frame to adapt the jaws to lasts of different lengths; and Fig. 13, a perspective view of one of the carriages detached from the machine.

In this machine the upper, at the toe and heel of the shoe, is first turned over upon the inner sole, and then the upper, at the shank and along the side of the shoe, front and back of the shank, is turned over upon the inner sole by independently-operated shank and side lasting devices, two or more sets, denominated by me as "lateral jaws," they being adapted to be moved laterally over the inner sole and last toward the center line of the last, and being made horizontally movable with relation to the bottom of the last by independent carriages, upon which the said shank and side lasting devices or lateral jaws are mounted, and being also vertically movable, as hereinafter described.

The carriages which carry the side-lasting devices or jaws that operate upon the upper at the sides of the toe and heel also carry the toe and heel lasting jaws. These lateral jaws, which operate upon the sides, ball, shank, and toe and heel of the upper, are simultaneously adjustable longitudinally, or in the direction of the last, by carriage and jaw moving devices adapted to separate the jaw-carrying carriages from or cause them to approach each other and be held in proper place, according to the length of the last.

In this embodiment of my invention the adjusting devices for moving the jaw-carrying carriages are adapted to move the carriages of the shank-lasting devices and that pair of ball-lasting devices next in front of it toward the toe of the last for a less distance than the heel and toe lasting jaws and their attached side-lasting jaws or devices.

The term "lasting device" is herein intended to include and refer only to that class of device which is adapted to act against and lay the edge of the upper horizontally over and hold it in position upon the face of the inner sole, to be there secured by nails or other fastenings.

A denotes a prismatic box or frame, mounted on a stand, B, in such manner as to be capable of being turned horizontally around on a tubular pivot, *a*, projecting upward therefrom, a couple of nuts, *b c*, being screwed on the pivot in order to keep the box in connection with it and the stand.

The toe and heel supporting standards C D, projected upward from the box A, hold the heel and toe rests E F, which are screwed thereon, in order that they may be adjusted to different heights to adapt them to receive and support the last at the proper altitude.

The heel-rest E is cylindrical, and is provided with a shoulder, *d*, to serve as a stop for the heel of the last, and the toe-support is inclined, as at *e f*, to fit the fore part of the last.

The toe and heel rests are properly disposed between a pair of heel and toe lasting jaws, G H, which are adjustably connected by set-screws *g g* with the slotted upper ends of the jaw-carrying levers I I′, so as to permit the said jaws to be adjusted to the proper altitude with relation to the last. These heel and toe jaw-carrying levers are pivoted upon heel and toe carriages N $N^3$, and are, at their lower ends, connected by toggles K K′, jointed to the upper part, *i*, of a vertically-reciprocating pitman, L, whose lower end, extended through the tubular pivot *a*, is connected with the pedal M, pivoted to the stand at B, so that by drawing down the said pitman the said heel and toe jaws will be simultaneously closed upon the shoe, after which, as hereinafter described, further descent of the said pitman will operate the shank and side lasting devices to close the upper over upon the face of the inner sole.

The rod *k* should be so applied to the pedal as to be capable of being revolved horizontally, in order to effect the connection of such rod with the foot *i* of the pitman, into which it is screwed, the same serving to enable the pitman to be lengthened or shortened, as occasion may require.

The lower portion of the rod *k* is provided with an elevating-spring, *n*, and slides freely through a horizontal cross head or bar, *l*, from which four or any other suitable number of pairs of springs, *m m*, are extended upward and arranged in manner as represented, the said springs acting as connecting-links between the said cross-head and the shank and side lasting devices or lateral jaws, to be hereinafter described. These springs *m*, at their upper ends, are connected with the levers *m′ m′*, arranged in pairs, one pair within and supported upon each of the carriages N N′ $N^2$ $N^3$, mounted so as to be slid horizontally upon the top of the box or frame-work A.

The levers *m′*, in pairs, rest side by side, and are provided with seats $m^2$, to rest upon the upper edges of the ends of the said carriages N N′ $N^2$ $N^3$, as represented in Fig. 2.

Each lever *m′ m′* of the series carries a lateral jaw, to operate either on the shank or side of the shoe, the jaw being formed as represented, and applied to the lever in a manner as shown in Fig. 9, wherein the foot of the arm of the jaw, provided with a tenon, *o*, is projected into a mortise, *p*, made in the lever *m′*, a screw, *q*, projected downward from the lower part of the arm of the jaw, receiving a shouldered nut, *r*, which rests upon the lever *m′*, and is kept in place thereon by a cap, *s*, fastened to the lever by screws *t t*, the whole being as shown in the drawings.

By revolving the nut *r* the jaw may be elevated or depressed so as to properly adjust its upper portion, $x^2$, to the level of the sole of the last, when such last may be in position on the heel and toe rests E F.

The lateral jaws for operating upon the upper along the sides of the shoe and last between the heel and toe lasting jaws, already described, may be designated, according to their functions, as the shank, ball, and side lasting jaws, all of the said jaws acting, however, upon the side of the shoe.

The shank-lasting jaws are marked O′, the ball-lasting jaws $O^2$, and the side-lasting jaws O and $O^3$, these last-mentioned jaws, however, being shown as connected with the same carriages which carry the heel and toe lasting jaws. Each of these jaws has an acting edge, (designated by the letter $x^2$,) which is adapted to act upon and force over upon the face of the inner sole beyond its edge the upper of the shoe being lasted.

These pairs of jaws O O′ $O^2$ $O^3$ and their levers *m′* are each pivoted upon the independent carriages N N′ $N^2$ $N^3$, respectively, and each of these carriages is provided with a stud, *v*, which is extended therefrom into one or the other of the oblique slots *w* or *w′* of a carriage and jaw moving device shown as a yoke, P, connected with the brackets *y* of the frame by adjusting-screws *x x*, the whole being so as to enable the yoke to be elevated or depressed by the said screws *x x*.

While the yoke is being raised its oblique slots, operating on the studs of the carriages N N′ $N^2$ $N^3$, will cause such carriages to simultaneously move apart from one another the pairs of jaws carried by them, the said jaws being thereby moved longitudinally with relation to the length of the last, to adapt the machine to last shoes of different sizes.

A downward movement of the yoke will cause reverse motion of the several pairs of lateral jaws—that is, they will be moved toward each other for smaller shoes.

It will be seen that the adjustment of the lateral jaws, both vertically and at different distances apart, enables them to be adapted to any last, so as to properly operate therewith in lasting a shoe. By depressing the pedal the heel and toe jaws will first be moved up to the last, after which the others or lateral jaws will be advanced toward it, the jaws of each pair opening or moving apart during the rise of the pedal, the said opening being due to the reaction of the spring *n*.

From the above it will be seen, after an upper or vamp of a shoe is applied to the last, and an insole placed thereon, and the last is fixed in position on the rests E F, that I have only to depress the pedal to cause the heel and toe and lateral jaws to grasp the said upper and crowd it over firmly upon the inner sole on the last, to which inner sole the upper may then be secured by tacks or other proper means.

The slots *w w*, which operate the carriages N $N^3$, are more oblique than the slots *w′ w′*, which act upon and move the carriages N′ $N^2$, that hold the shank and ball lasting jaws O′ $O^2$, and a certain equal movement of the carriage-moving device P at both ends will move the carriages N $N^3$ over a greater distance than the carriages N′ $N^2$, as is necessary and essential in the proper-proportioned adjustment to adapt the heel and toe and lateral jaws to shoes of different lengths.

Prior to this my invention, so far as I am aware, the upper has been laid over upon the inner sole by single plates extended along the side of the last, and these plates have been changed for shoes of different sizes; and I am not aware of any lasting mechanism wherein independent sets of narrow jaws or devices at the sides of the last have been made adjustable in the direction of the length of the last, to enable the same lateral jaws or devices to last shoes of different sizes.

I claim—

1. In a lasting-machine, independent heel and toe rests for the last, heel and toe lasting jaws, and two or more pairs of lateral jaws or side-lasting devices at the side of the last, combined with means to automatically operate the said side-lasting devices and cause them to crowd the edges of the upper at the sides of the last over upon the face of the inner sole, substantially as described.

2. In a lasting-machine, heel and toe lasting jaws and two or more pairs of lateral jaws or devices for lasting the sides of the shoe, combined with mechanism adapted to adjust the said heel and toe lasting jaws toward and from each other, substantially as described.

3. In a lasting-machine, heel and toe lasting jaws or plates and two or more pairs of lateral jaws or devices to lay the edges of the upper over upon the face of the inner sole, combined with devices to adjust the said lateral jaws toward and from each other to adapt them to operate upon lasts of different lengths.

4. In a lasting-machine, heel and toe lasting jaws or plates and two or more pairs of lateral jaws or devices to lay the edges of the upper over upon the face of the inner sole, combined with mechanism to adjust the said toe, heel, and lateral jaws or devices horizontally in the direction of the length of the last, to adapt the said lasting mechanism to shoes of different lengths.

5. In a lasting-machine, heel and toe lasting jaws or plates and two or more pairs of lateral jaws or devices to lay the edges of the upper over upon the inner sole, combined with mechanism connecting the supports of the said heel and toe and lateral jaws or devices, to enable them to be simultaneously adjusted horizontally to last shoes of different lengths.

6. In a lasting-machine provided with heel and toe lasting jaws or plates and lateral jaws or devices to lay the edges of the upper over upon the face of the inner sole, adjusting mechanism to simultaneously move the supports of the said jaws horizontally at different speeds to give them the proper proportional movement for shoes of different lengths.

7. In a lasting-machine, toe and heel lasting jaws, and two or more pairs of lateral jaws or devices to lay the upper at the sides of the last over upon the face of the inner sole, combined with mechanism adapted to first close the toe and heel lasting jaws and crimp the upper over the toe and heel of the inner sole, and then to close the independent lateral jaws to last the side of the shoe and lay the edge of the upper over upon the face of the inner sole beyond its edge, to be then held by the jaws until secured, substantially as described.

8. In a lasting-machine, a series of pairs of lateral jaws or devices supported upon independent carriages and adapted to operate upon the upper, one pair at the shank of the shoe, another pair just in advance of the shank, and two other pairs to operate upon the sides of the shoe near its toe and heel, the said carriages being adjustable to enable the lasting jaws or devices carried by them to operate upon lasts of different lengths, and means to close the said jaws or devices upon the shoe and last and lay the upper along its sides over upon the face of the inner sole beyond its edge, substantially as described.

9. In a lasting-machine, a series of pairs of lateral jaws or devices adapted to have their acting edges forced over the inner sole beyond its side edges, and means whereby the said lateral jaws or devices may be adjusted to different altitudes, substantially as and for the purpose described.

10. In combination, the heel and toe and lateral jaws, the levers I I′, toggles K K′, pitman L, pedal M, spring *n*, bar *l*, springs *m m*, and levers *m′ m′*, applied and to operate as specified.

11. The pitman L of the jaw-operative mechanism, formed of two parts, *i k*, connected by screws, as and for the purpose specified.

12. The combination of the frame or box A and the lasting mechanism thereof with the stand B, by means described, so as to be capable of being revolved relatively to the stand, as set forth.

13. In a lasting-machine, a toe-support and a horizontally-movable toe-jaw carriage, combined with toe-lasting jaws, made vertically adjustable with relation to the said carriage and toe-support to place the said toe-jaws at the proper level with relation to the toe-rest, substantially as described.

14. In a lasting-machine, a series of pairs of independent adjustable side-lasting jaws or devices adapted to be adjusted to operate upon lasts of different length and shape, combined with mechanism to simultaneously operate the said side-lasting devices to crowd the upper along both sides of the last over upon the face of the inner sole, substantially as described.

CHARLES H. TRASK.

Witnesses:
N. E. WHITNEY,
G. W. GREGORY.